United States Patent [19]

Murphy

[11] Patent Number: 4,734,171

[45] Date of Patent: Mar. 29, 1988

[54] ELECTROLYTIC PROCESS FOR THE SIMULTANEOUS DEPOSITION OF GOLD AND REPLENISHMENT OF ELEMENTAL IODINE

[75] Inventor: Jack W. Murphy, Laramie, Wyo.

[73] Assignee: In-Situ, Inc., Laramie, Wyo.

[21] Appl. No.: 806,043

[22] Filed: Dec. 6, 1985

Related U.S. Application Data

[63] Continuation-in-part of Ser. No. 598,706, Apr. 10, 1984, Pat. No. 4,557,759.

[51] Int. Cl.$^4$ .......................... C22B 11/04; C25B 1/24
[52] U.S. Cl. ..................... 204/111; 204/128; 75/101 R; 75/108; 75/118 R; 423/38; 423/39; 423/42; 423/46; 423/500
[58] Field of Search ............. 204/111, 128; 75/101 R, 75/108, 118 R, 121; 423/38, 39, 42, 46, 500

[56] References Cited

U.S. PATENT DOCUMENTS

| | | | |
|---|---|---|---|
| 2,304,823 | 12/1942 | Harrison | 75/118 R |
| 3,495,976 | 2/1970 | Bazilevsky et al. | 75/101 R |
| 3,625,674 | 4/1969 | Jacobs | 75/101 R |
| 3,772,003 | 11/1973 | Gordy | 204/111 |
| 3,778,252 | 12/1973 | Wilson | 75/101 R |
| 3,826,750 | 7/1974 | Wilson | 252/187 R |
| 3,957,505 | 5/1976 | Homick et al. | 75/108 |
| 3,957,603 | 5/1976 | Rhodes | 204/111 |
| 4,131,454 | 12/1978 | Piret et al. | 75/118 R |
| 4,190,489 | 2/1980 | Bahl et al. | 156/664 |
| 4,319,923 | 3/1982 | Felanga et al. | 75/108 |
| 4,375,984 | 3/1983 | Bahl et al. | 75/97 A |
| 4,510,026 | 4/1985 | Spaziante | 204/128 |
| 4,557,759 | 12/1985 | McGrew et al. | 75/118 R |

Primary Examiner—Robert L. Stoll
Attorney, Agent, or Firm—Sheridan, Ross & McIntosh

[57] ABSTRACT

An improved process for recovering gold from gold-containing materials by iodide/iodine leaching is provided wherein the pregnant lixiviant containing solubilized gold and iodine is treated in an electrolytic cell to reduce gold in solution to elemental gold for recovery and reduce iodine to iodide at the cathode, so as to prevent iodine from interfering with subsequent gold recovery processes, and at the same time reoxidize iodide present at the anode to elemental iodine to regenerate the leach solution to the desired iodide:iodine weight ratio, e.g. about 2:1 to about 10:1. Gold is precipitated in the cathode compartment, and if desired, the cathode effluent may be treated for further removal of traces of gold before being passed to the anode compartment. A method for preventing iron contamination of the cathode is also provided comprising buffering the lixiviant solution to a pH of about 5.

14 Claims, 1 Drawing Figure

4,734,171

ELECTROLYTIC PROCESS FOR THE SIMULTANEOUS DEPOSITION OF GOLD AND REPLENISHMENT OF ELEMENTAL IODINE

CROSS-REFERENCE TO RELATED APPLICATIONS

This is a continuation-in-part of application Ser. No. 598,706, filed Apr. 10, 1984, now U.S. Pat. No. 4,557,759.

TECHNICAL FIELD

This invention lies in the field of hydrometallurgy. In particular, it involves the simultaneous electrolytic recovery of gold and restoration of elemental iodine in spent lixiviant solutions used, for example, in in situ mining, heap-leach mining, or agitated-leach recovery processes.

BACKGROUND OF THE INVENTION

Iodine/iodide leaching processes for the recovery of gold from gold-containing materials are well known to the art, and are described for example, in Applicant's U.S. patent application Ser. No. 598,706, to be issued as U.S. Pat. No. 4,557,759, incorporated herein by reference, and in U.S. Pat. Nos. 2,304,823 and 3,957,505.

When iodine and iodide attack an auriferous ore containing pyrite or other reducing materials, gold is solubilized as an iodide complex, either $AuI_2^-$ or $AuI_4^-$, and pyrite or other reducing materials are oxidized by elemental iodine, forming iodide as one of the products. For the mining process to be economical, the lixiviant must be recycled; thus, any iodine which has been reduced must be restored to the solution in the oxidized (elemental) form, and the gold must be removed.

This combination of requirements, restoration of iodine and removal of gold, is difficult to accomplish inexpensively either simultaneously or sequentially. The difficulty arises from the fact that elemental iodine and the iodo-gold complex behave similarly in the presence of reducing agents, ion-exchange resins, and activated carbon. Thus, cementation of gold onto iron or zinc results in the solubilization of large amounts of these metals because iodine as well as gold effects their oxidation. Adsorption of gold onto an anion resin or activated carbon is inhibited by simultaneous adsorption of iodine onto available sites, and elemental iodine is quantitatively removed from the solution in the process.

The object of the present invention is to provide an economic process for recovering gold from an iodine-containing lixiviant in a one-step process in which gold and iodine are electrolytically reduced simultaneously with the oxidation of iodide. Iodine is produced at a rate sufficient to provide for a recycle leaching of gold. A further object of the invention is to prevent iron fouling of the electrolysis.

SUMMARY OF THE INVENTION

Figure 1:
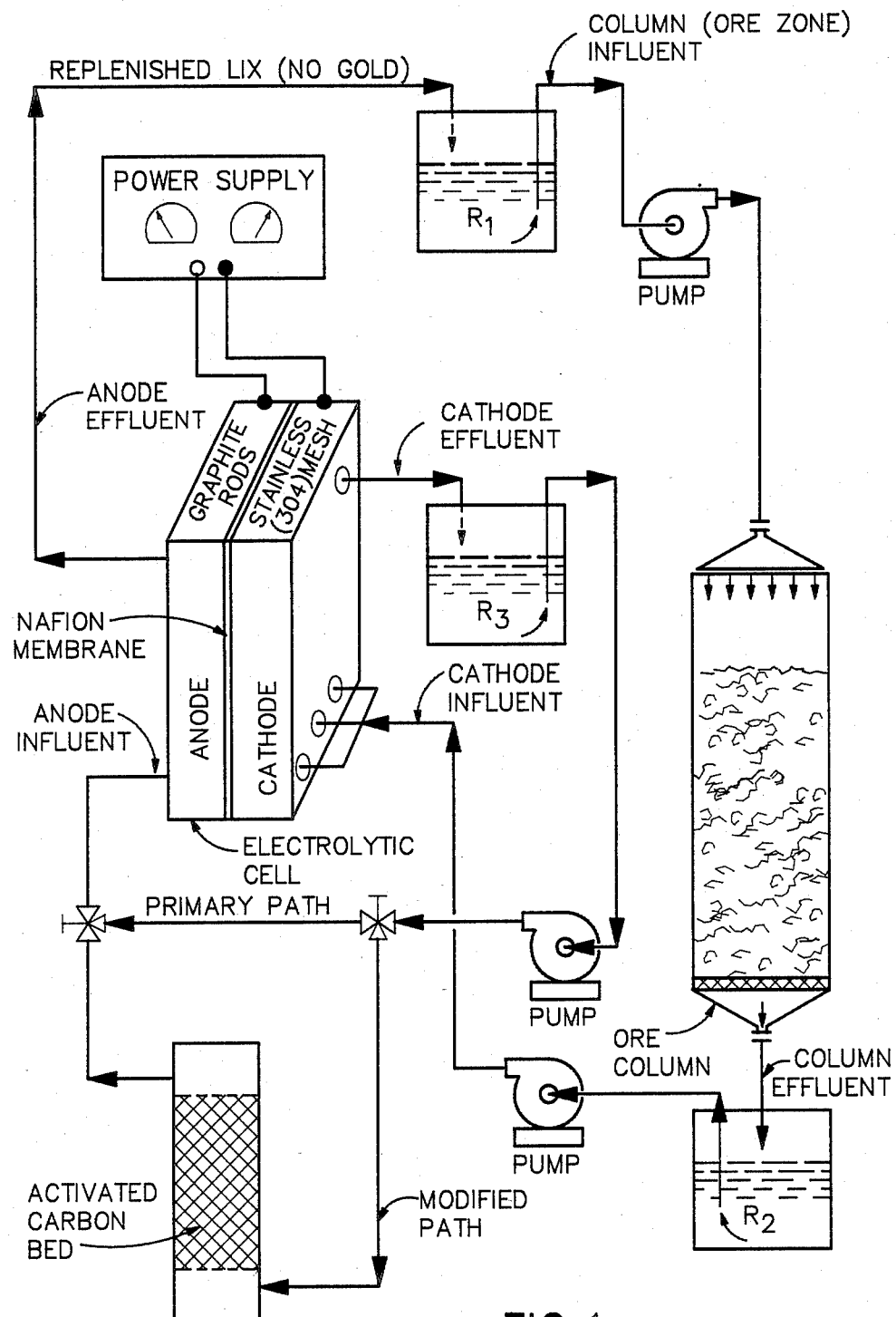
FIG. 1 is a schematic drawing of a laboratory set-up in which iodine/iodide lixiviant solution is sprinkled onto a column of crushed auriferous ore, and the column effluent is passed through an electrochemical cell for removal of gold and regeneration of iodine before being recycled back onto the ore column.

An improved process for recovering gold from gold-containing materials including auriferous ores by iodide/iodine leaching is provided wherein the pregnant lixiviant containing dissolved gold and iodine is treated in an electrolytic cell to reduce gold in solution to elemental gold for recovery and simultaneously reduce iodine to iodide at the cathode, so as to prevent iodine from interfering with subsequent gold recovery processes. Concomitantly, iodide present at the anode is oxidized to elemental iodine to regenerate the leach solution to the desired iodide:iodine weight ratio, e.g. about 2:1 to about 10:1. Gold is precipitated in the cathode compartment, and if desired, the cathode effluent may be treated for further removal of traces of gold before being passed to the anode compartment. A method for preventing iron contamination of the cathode is also provided comprising buffering the lixiviant solution to a pH of about 5.

DESCRIPTION OF THE PREFERRED EMBODIMENTS

The process described herein involves the simultaneous electrolytic reduction of iodine and reduction and precipitation of gold at a cathode, preferably a stainless steel cathode, with concomitant reoxidation of iodide to iodine at the anode, preferably a carbon anode, of the same cell. In a modification of the process, the cathode effluent is subjected to a process for removal of gold, such as by being passed through a bed of activated carbon or anion exchange resin to remove traces of gold before passing into the anode compartment. All iodine in the solution entering the ore zone is reduced to iodide either in the ore zone or in the cathode compartment of the electrolytic cell, and is then completely replenished by oxidation in the anode compartment of the cell. Since no iodine is present in the cathode effluent, no iodine is available for adsorption onto the carbon bed or anion exchange resin in the modified process.

The current in the cell is adjusted to generate the desired concentration of elemental iodine in the anode effluent. The total combined iodine and iodide concentration depends on the characteristics of the material being leached (3 gpl is a typical total iodide-iodine concentration for use in in situ mining). The iodide to iodine ratio in the regenerated lixiviant is also a function of the qualities of the feed material, however when too low an iodide to iodine ratio, i.e., too much iodine, is produced, the rate of solubility of iodine at the anode will not keep pace with iodine generation and cause iodine to crystallize on the anode and interfere with the process. If the iodide to iodine ratio is too high, i.e., too little iodine, the iodine may be exhausted before the gold leaching is completed, causing gold to redeposit in the feed material. Preferably an iodide ratio of at least about 2:1 is desirable, and ratios up to about 10:1 are generally useful. For solutions containing depleted iodine concentrations after interaction with reducing materials in the ore zone, the quantity of oxidized iodine in the cathode compartment will be insufficient to carry the total current used to regenerate the iodine in the anode compartment. The remainder of the current must then be carried by some other cathode half-reaction; usually this additional half-reaction will be the reduction of water to hydrogen gas (in addition to the small contribution from the reduction of gold complex to elemental gold). The cell voltage necessary to be applied to effect the gold-recovery/iodine regeneration is then the difference in half-cell potentials between the iodide/iodine oxidation and the reduction of water at the cathode pH, plus any cathode overvoltage for the water reduction plus the ohmic drop in the cell. Algebraically, this may be expressed as:

$$E_{app} = E_I - {}_{/I_2} + E_{H_2O/H_2} + IR_{cell} + E_{cath,over}$$

The power requirement for effecting this process is the product of the current times the applied voltage:

$$P = IE_{app}$$

It is thought that the chemical reactions taking place in the process are described by the following equations:
In the ore zone:

$$8H_2O + 7I_3^- + FeS_2 \rightarrow Fe^{2+} + 2SO_4^{2-} + 21I^- + 16H^+$$

$$2Au + I^- + I_3^- \rightarrow 2AuI_2^-$$

In the cathode compartment:

$$I_3^- + 2e^- \rightarrow 3I^-$$

$$AuI_2^- + e^- \rightarrow Au + 2I^-$$

$$2H_2O + 2e^- \rightarrow H_2 + 2OH^-$$

In the anode compartment:

$$3I^- \rightarrow I_3^- + 2e^-$$

When lixiviant solution first contacts a pyrite ore zone, it is common for extensive interaction between the iodine and the pyrite to take place rapidly because of the presence in the ore of finely divided pyrite particles. For unbuffered lixiviant solutions, the pH can drop rapidly to about three or less and a considerable quantity of iron can be solubilized. The high concentrations of iron thus produced will then be transported to the cathode where undesirable electrode reactions or chemical precipitations can occur. To prevent this untoward situation, the lixiviant solution may be buffered with a non-reducing buffer, preferably sodium acetate/acetic acid, to a pH sufficient to prevent iron dissolution, preferably at least about 5; this keeps the iron concentration to a low enough level that it interferes very little with the operation of the electrolysis cell. Buffering the lixiviant also retards dissolution of the stainless steel cathode, the degradation of the cathode being a hundred times faster at pH 3 than at pH 5.

FIG. 1, depicting a preferred embodiment of this invention, shows original or regenerated lixiviant containing an optimum iodide:iodine ratio at reservoir $R_1$ being pumped into an ore column, from which pregnant lixiviant containing dissolved gold and reduced iodine, i.e. a higher iodide:iodine ratio than present in the original or regenerated lixiviant, flows into reservoir $R_2$. The pregnant lixiviant is conducted to the stainless steel mesh cathode of an electrolytic cell equipped with a conventional power supply where gold is reduced to elemental gold and precipitated onto the cathode, and substantially all the iodine present in the lixiviant is reduced to iodide. The cell is shown with a Nafion (Du Pont Co.) membrane separating the anode and cathode compartments. This membrane is a sheet of cation exchange material which is impervious to water and anions but permits passage of cations from the anode compartment to the cathode compartment. This arrangement prevents mixing of anolyte and catholyte while still permitting maintenance of electro-neutrality in the cell compartments as the electrode reactions take place. The goldbarren cathode effluent containing virtually no iodine is collected at reservoir $R_3$ from whence it may be conducted in the modified path to an activated carbon bed for removal of traces of gold, and then be conducted to the graphite rod anode compartment of the electrolytic cell. Alternatively, the gold- and iodine-barren lixiviant may be conducted from $R_3$ via the primary path directly to the anode compartment. In the anode compartment, iodide is oxidized to iodine in an amount sufficient to provide a regenerated lixiviant for reuse, and the regenerated lixiviant is conducted to $R_1$ and recycled.

The following examples are illustrative of the invention and not intended to be limiting.

EXAMPLE 1

In a typical laboratory-scale embodiment of this process, unbuffered solution containing 9 grams/liter ionic iodide and 1 gram/liter elemental iodine was pumped from a reservoir at 75 ml./min. into a glass column 23 cm. wide by 30 cm. long containing approximately 15 kg. of pyritic gold ore. Effluent from the column was depleted somewhat in iodine and contained gold ranging in concentration 10 to 0.1 mg./liter. This effluent solution was pumped into the cathode compartment of the electrolysis cell and reduced at 1.0 amp of current using an applied voltage of 2.0 volts. No gold or elemental iodine was detected in the cathode effluent. The cathode effluent was then pumped into the anode compartment of the same electrolysis cell wherein iodide was oxidized to elemental iodine at such a rate that the anode effluent was replenished to 1 gram/liter iodine. A cell current efficiency of 95 percent was achieved.

EXAMPLE 2

In a typical laboratory-scale embodiment of the electrolysis process, a current of 1.00 amp was required to replenish 1.00 gram iodine/liter flowing through the cell at 75 ml./min., and the applied voltage was measured to be 2.0 volts. That current reflects a 95 percent current efficiency for the anode half-reaction. Thus the power consumption rate (current times voltage) was 2.0 watts. Simultaneously in the cell, gold was being reduced at the cathode in the amount of 2 mg./liter at the same flow rate of 75 ml./min. At this rate, in one hour's time 9 mg. of gold metal was deposited at the cathode. The energy consumption was then 2 watt-hours per 9 mg. Au or 0.22 KWH/gm. Au. At 10¢ per KWH this computes to 2.2¢/gm. Au. Since a gram of gold is currently valued at about $10, this cost is insignificant.

What is claimed is:
1. A process for the recovery of gold from a gold-containing material comprising:
 (a) leaching the gold-containing material with a lixiviant containing iodide and iodine in concentrations sufficient to solubilize gold;
 (b) separating pregnant lixiviant containing gold in solution and iodine from the leach residue;
 (c) conducting said pregnant lixiviant to the cathode of an electrolysis cell;
 (d) reducing substantially all the iodine in said pregnant lixiviant to iodide at said cathode and simultaneously reducing and precipitating gold;
 (e) conducting the lixiviant of step (d) to the anode of said electrolysis cell; and

(f) oxidizing iodide to iodine at said anode in quantities sufficient to regenerate the lixiviant.

2. The process of claim 1 in which the regenerated lixiviant is recycled to step (a).

3. The process of claim 1 in which between steps (d) and (e), the lixiviant is treated for removal of trace amounts of gold contained therein.

4. The process of claim 1 in which the regenerated lixiviant of step (e) contains an iodide:iodine ratio sufficient to prevent iodine crystallization at the anode.

5. The process of claim 4 in which the iodide:iodine ratio is at least about 2:1.

6. The process of claim 1 in which the electrolysis cell contains anode and cathode compartments separated by a cation exchange membrane impervious to water and anions, but permitting passage of cations from the anode compartment to the cathode compartment.

7. The process of claim 6 in which the cathode comprises stainless steel, the anode comprises carbon and the membrane is comprised of a perfluorosulfonic acid membrane.

8. The process of claim 1 in which the goldcontaining material contains iron and the lixiviant of step (a) is buffered to a pH sufficient to substantially prevent dissolution of iron, so as to prevent iron fouling of the cathode.

9. The process of claim 8 in which the pH is at least about 5.

10. In a process for the recovery of gold from gold-containing materials comprising dissolving said gold in an iodide/iodine lixiviant and recovering gold from said lixiviant, the improvement comprising preventing iodine in the pregnant gold-containing lixiviant from interfering with gold recovery therefrom by simultaneously reducing substantially all the iodine present in the gold-containing lixiviant and reducing and precipitating gold therefrom at the cathode of an electrolysis cell.

11. The process of claim 10 comprising the further improvement of preventing iron contamination of said cathode when said gold-containing feed material also contains iron, by buffering the lixiviant to a pH sufficient to prevent substantial dissolution of iron when leaching the feed material.

12. The process of claim 10 in which the lixiviant effluent from said cathode is treated for further removal of gold.

13. The process of claim 10 in which lixiviant containing a iodide:iodine ratio for dissolution of gold from a gold-containing material is regenerated at the anode of said electrolysis cell by oxidizing iodide to iodine.

14. The process of claim 13 in which the iodide:iodine ratio of said regenerated lixiviant is at least about 2:1.

* * * * *